Oct. 21, 1958  G. A. LYON  2,857,206
WHEEL COVER
Filed June 23, 1954
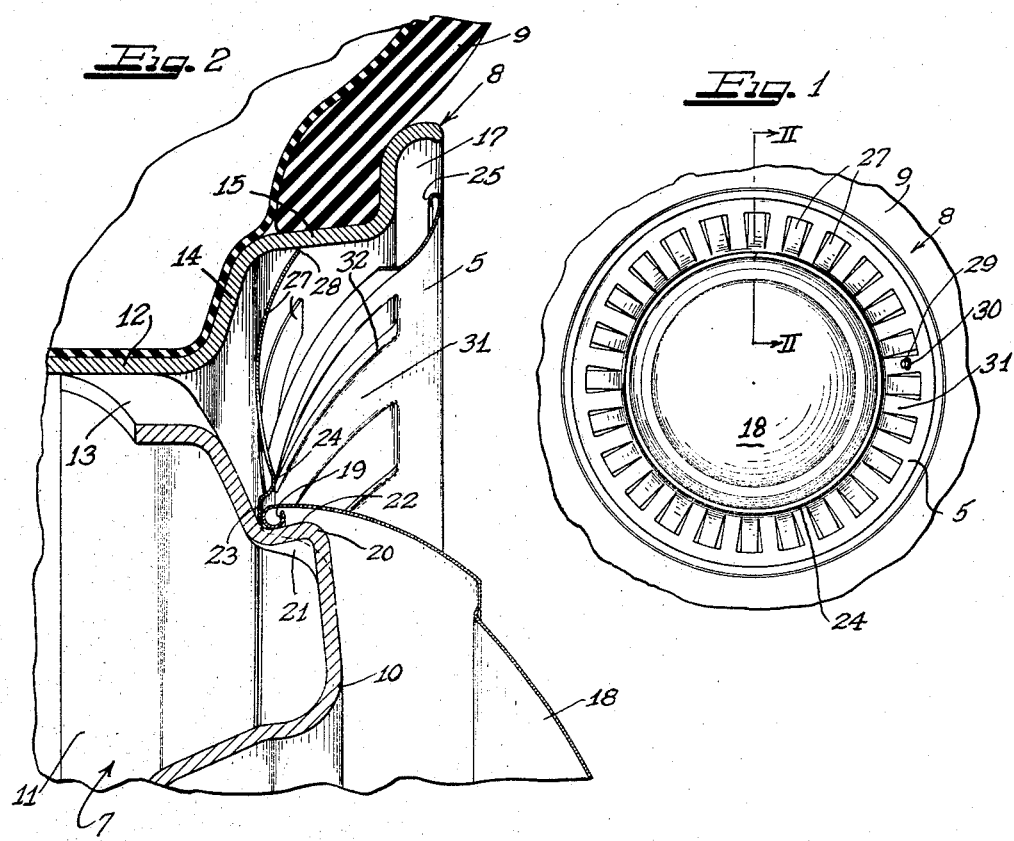
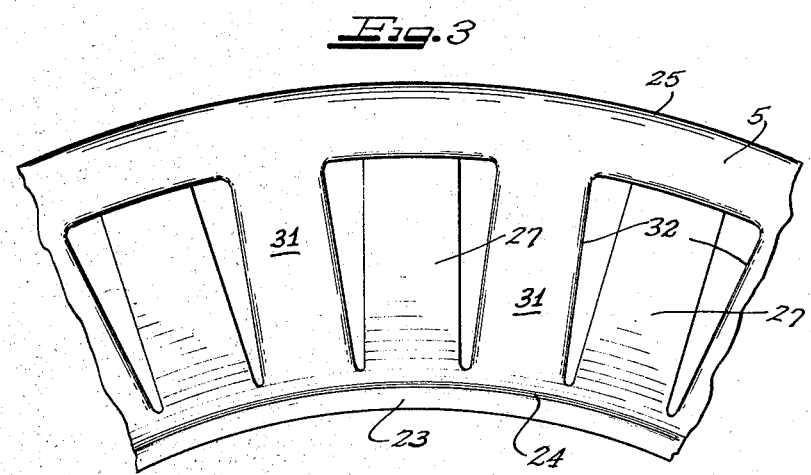
Inventor
GEORGE ALBERT LYON United States Patent Office 2,857,206
Patented Oct. 21, 1958

2,857,206

WHEEL COVER

George Albert Lyon, Detroit, Mich.

Application June 23, 1954, Serial No. 438,779

10 Claims. (Cl. 301—37)

The present invention relates to improvements in wheel structures and more particularly concerns the ornamental and protective covering of the outer sides of vehicle wheels.

An important object of the present invention is to provide an improved wheel structure with novel cover means at the outer side thereof.

Another object of the invention is to provide a novel cover assembly for the outer sides of vehicle wheels.

A further object of the invention is to provide an improved hub cap and wheel trim combination for the outer sides of vehicle wheels.

Still another object of the invention is to provide an improved wheel cover structure for the outer sides of vehicle wheels.

A still further object of the invention is to provide an improved wheel structure having a wheel cover in novel retained relation thereon.

Other objects, features and advantages of the present invention will be readily apparent from the following detailed description of a preferred embodiment thereof taken in conjunction with the accompanying drawing in which:

Figure 1 is a side elevational view of a vehicle wheel embodying features of the invention;

Figure 2 is an enlarged fragmentary radial sectional view taken substantially on the line II—II of Figure 1; and Figure 3 is a fragmentary plan view of the trim ring member of the cover assembly.

According to the present invention, a cover member 5 is adapted to be applied to the outer side of a vehicle wheel comprising a wheel body 7 which may be of the pressed disk spider type and supporting a multi-flange, drop-center tire rim 8 adapted to carry a pneumatic tire and tube assembly 9. The wheel body 7 has an intermediate annular axially outwardly directed nose bulge 10 and an annular radially outer axially inwardly directed attachment flange 11 by which the wheel body is attached to a base flange 12 of the tire rim. For air circulation the attachment flange 11 may be inset at suitable intervals such as 3 to 5 to provide openings 13. Extending generally radially outwardly from the outer side of the base flange 12 on the tire rim is a side flange 14 which merges with an intermediate generally axially outwardly extending and radially outwardly sloping intermediate flange 15 from the outer side of which extends a generally radially outwardly and then axially outwardly turned terminal flange 17.

Herein the cover member 5 comprises a trim ring which is adapted to be applied in covering relation to the outer side of the tire rim 8 and the adjacent portion of the wheel body radially outwardly from the nose bulge 10, and a hub cap 18 is provided for covering the central portion of the wheel body 7, including the nose bulge 10. At its marginal extremity the hub cap 18 is preferably formed with an under and inwardly turned resilient reinforcing and hub cap retaining bead 19 adapting the same to be engaged retainingly with generally radially outwardly projecting retaining bumps 20 on the outer side of the nose bulge 10 which, for this purpose, is provided with a generally radially outwardly facing angular shoulder 21 from which the bumps project. Each of the bumps 20, of which there may be three or more equally annularly or circumferentially spaced about the shoulder 21, has a generally radially outwardly facing but axially and radially inwardly sloping oblique cover engageable shoulder 21 which to its root is in radially outwardly spaced relation to the shoulder 21 so as to maintain the retaining bead 19 of the hub cap under resilient tension at the bumps. This mode of attachment of hub caps or covers is covered broadly in my Patent No. 2,445,330 issued July 20, 1948.

According to the present invention, the cover ring member 5 is constructed to be applied to the outer side of the wheel in a self-retaining manner and may cooperate at its radially inner margin with the adjacent margin of the hub cap 18. To this end, the trim ring cover member 5 is provided with an inner marginal flange 23 adapted in assembly to bear against the wheel body 7 adjacent the inner ends of the retaining bumps 20 and of a smaller diameter than the outside diameter of the adjacent margin of the hub cap 18 so that in assembly the edge of the hub cap overlaps the flange 23. Spaced radially outwardly adjacent the edge of the hub cap the trim ring 5 may be provided with a generally axially outwardly humped annular reinforcing and pry-off ribs 24 which will assist in effecting leverage by means of a pry-off tool such as a screwdriver against the hub cap bead 19 for prying the hub cap from the retaining bumps 20. By preference the body of the trim ring 5 extends generally radially and axially outwardly into spaced overlying relation to the tire rim and the outer marginal extremity of the trim ring is provided with an underturned reinforcing and finishing bead-like flange 25.

Means are provided for enabling the trim ring 5 to be self-retaining on the wheel and for this purpose a suitable number of narrow radially outwardly directed retaining fingers 27 are struck from the body of the trim ring or cover member 5 and are pressed inwardly therefrom to extend geneally radially in divergent relation therebehind for engagement at retaining tips 28 with the intermediate flange 15. By preference the retaining fingers 27 are of substantial length and have their inner ends integral in one piece with the body of the trim ring cover member 5 adjacent the radially outer side of the reinforcing rib 24. The normal length of the retaining fingers 27 is such that the tips 28 normally extend to a diameter which is slightly greater than at least the intermediate diameter of the intermediate flange 15. Moreover, the fingers 27 are preferably bowed on a transverse axis axially inwardly so as to facilitate resilient tensioned deflection of the fingers to increase the bowed condition thereof as the fingers are worked axially inwardly along the sloping cam surface of the intermediate flange 15 as an incident to applying cover member 5 to the wheel. Therefore, as the retaining fingers are progressively and uniformly placed under radially inward compression and thus resilient tension tending to thrust the retaining tips 28 securely into retaining engagement with the inner surface of the intermediate flange, substantially biting retaining gripping connection of the finger tips with the intermediate flange assures thorough retention of the cover member on the wheel. Moreover, the resilient tension of the fingers tends to react against the inner marginal flange 23 to press the same firmly against the wheel. Then, when the hub cap 18 is applied to the outer side of the wheel by snapping the same over the retaining bumps 20, the retaining bead 19 thrusting against the flange 23 additionally serves to retain the trim ring 5 in place.

By virtue of the multiplicity of retaining fingers 27, turning of the trim ring 5 on the wheel is substantially precluded, and this is advantageous in preventing distortion of a valve stem 29 extending through an appropriate valve stem aperture 30 in one of the spoke-like radially extending portions 31 of the trim ring member intermediate the apertures provided in the trim ring body by striking out of the retaining fingers 27.

In order to finish and substantially reinforce the trim ring about the apertures between the spoke portions 31, the margins defining the apertures at the sides and radially outer ends thereof are preferably turned in to provide reinforcing and finishing flanges 32. Thereby, moreover, the apertures are also slightly increased and thus air circulation through the trim ring and the wheel openings 13 is improved. It will be observed that the apertures between the spokes are opposite the wheel openings 13. However, the retaining fingers 27 substantially conceal the wheel openings and the tire rim side flange 14 and the portion of the body adjacent the tire rim, across which the retaining fingers extend.

By having the trim ring member 5 self-retained on the wheel by means of the retaining fingers 27, removal of the hub cap 18 may be effected as desired without removing the trim ring. On the other hand, should it be desired to remove the trim ring, the long resiliently flexible retaining fingers 27 enable such removal by prying or pulling the trim ring axially outwardly from the wheel.

It will be observed on inspection of Figure 2 that the radially outer portion of the trim ring 5, namely that portion which overlies the terminal flange 17, is preferably spaced substantially from the tire rim and accordingly air circulation is further improved past the tire rim. Furthermore, dirt or gravel that may work in behind the trim ring is readily cleared therefrom centrifugally or by dropping out through the gap between the outer margin of the cover and the tire rim as the wheel turns.

It will be understood that modifications and variations may be effected without departing from the scope of the novel concepts of the present invention.

I claim as my invention:

1. In a wheel structure including a tire rim and a wheel body supporting the same, the tire rim having a generally radially inwardly facing annular flange, a cover for disposition at the outer side of the wheel comprising a cover member having a portion thereof in engagement with the wheel body and a radially outer portion for overlying the tire rim, and a plurality of apertures in the cover member with radially outwardly directed retaining fingers formed from the material struck from the cover member in forming the apertures, the fingers being connected adjacent to the wheel body engaging portion of the cover member in underlying relation to the openings and having retaining tips in gripping engagement with said rim flange.

2. In a wheel structure including a wheel body and a tire rim with wheel openings adjacent juncture of the tire rim and wheel body, a cover for disposition at the outer side of the wheel comprising a cover member having an inner portion for overlying the wheel body and an outer portion for overlying the tire rim and alternating series of radially extending spokes with apertures therebetween and retaining fingers intermediate the spokes in underlying relation to the apertures and retainingly engageable endwise against a flange of the tire rim, said apertures affording air circulation through the cover member and said wheel openings.

3. In a wheel structure including a wheel body and a tire rim with wheel openings adjacent juncture of the tire rim and wheel body, a cover for disposition at the outer side of the wheel comprising a cover member having an inner portion for overlying the wheel body and an outer portion for overlying the tire rim and alternating series of radially extending spokes with apertures therebetween and retaining fingers intermediate the spokes in underlying relation to the apertures and retainingly engageable endwise against a flange of the tire rim, said apertures affording air circulation through the cover member and said wheel openings, said cover member having an inner portion engageable with the wheel body and a radially outer portion maintained thereby in spaced relation to the tire rim and thus affording a gap between the outer portion of the cover and the tire rim for further assisting in air circulation behind the cover.

4. In a wheel structure including a tire rim and a wheel body having generally radially outwardly directed retaining bumps thereon, a hub cap engageable with the outer side of the wheel body and having retaining means on its margin in snap-on pry-off engagement with said bumps, and a trim ring member extending in substantially overlying relation to the tire rim and having an inner margin engaging the wheel body adjacent the margin of the hub cap, said trim ring member having a series of radially outwardly extending retaining fingers struck out therefrom and provided with retaining edges engaging with a rim flange and inner ends attached integrally in one piece with the trim ring adjacent the inner portion of the trim ring which engages the wheel body.

5. In a wheel structure including a tire rim and a wheel body having generally radially outwardly directed retaining bumps thereon, a hub cap engageable with the outer side of the wheel body and having retaining means on its margin in snap-on pry-off engagement with said bumps, and a trim ring member extending in substantially overlying relation to the tire rim and having an inner margin engaging the wheel body adjacent the margin of the hub cap, said trim ring member having a series of radially outwardly extending retaining fingers struck out therefrom and provided with retaining edges engaging with a rim flange and inner ends attached integrally in one piece with the trim ring adjacent the inner portion of the trim ring which engages the wheel body, said portion that engages the wheel body having a reinforcing and pry-off rib spaced radially outwardly adjacent to the margin of the hub cap and engageable by a pry-off tool in prying the hub cap from the wheel.

6. In a wheel structure including a wheel body and a tire rim, a cover for disposition at the outer side of the wheel including a cover member for overlying the wheel body and provided with an alternating series of generally radially extending spokes for overlying the tire rim and apertures between the spokes, with retaining fingers intermediate the spokes and underlying the apertures between the spokes and retainingly engageable endwise under resilient tensioned thrust against a flange of the tire rim, said fingers substantially closing the apertures so as to substantially conceal the wheel behind the apertures.

7. In a wheel structure including a wheel body and a tire rim, a cover member for disposition at the outer side of the wheel and including a body provided with a series of elongated openings from which are struck a series of generally radially extending elongated retaining fingers having retaining tips at one end and attached integrally in one piece with the cover member at one end of the openings and extending across the openings behind the cover and engageable at the tips of the fingers in resilient tensioned thrust relation against a generally radially oppositely facing portion of the wheel.

8. In a wheel structure including a wheel body and a tire rim, a cover member for disposition at the outer side of the wheel and including a body provided with a series of elongated openings from which are struck a series of generally radially extending elongated retaining fingers having retaining tips at one end and attached integrally in one piece with the cover member at one end of the openings and extending across the openings behind the cover and engageable at the tips of the fingers in resilient tensioned thrust relation against a generally radially opposingly facing portion of the wheel, said fingers being inwardly bowed to facilitate resilient tensioning thereof in engagement with said wheel portion.

9. In a wheel structure including body and rim parts, a cover member for disposition at the outer side of the wheel having a generally axially outwardly and radially extending portion with generally radially elongated apertures therein provided by the striking out of retaining fingers from said cover portion, said retaining fingers being integral in one piece with the cover portion at one end of the apertures and extending generally radially divergently relative to said cover portion inwardly relative to the cover and generally longitudinally behind and across said apertures and engageable at their free ends with one of said wheel parts, the construction and arrangement being such that in viewing the cover from the outer side of the wheel, the apertures appear to be substantially concealed by said fingers.

10. In a wheel structure including a wheel body and a tire rim, a cover member for disposition at the outer side of the wheel and including a body provided with a series of elongated openings from which are struck a series of generally radially extending elongated retaining fingers having retaining tips at one end and attached integrally in one piece with the cover member at one end of the openings and extending across the openings behind the cover and engageable at the tips of the fingers in resilient tensioned thrust relation against a generally radially opposingly facing portion of the wheel, the free margins defining the openings being turned generally axially inwardly to provide finishing and reinforcing flanges thereon.

References Cited in the file of this patent

UNITED STATES PATENTS

| | | |
|---|---|---|
| Re. 22,428 | Lyon | Feb. 1, 1944 |
| 1,821,137 | Bostock | Sept. 1, 1931 |
| 2,083,066 | Hunt | June 8, 1937 |
| 2,263,243 | Lyon | Nov. 18, 1941 |
| 2,368,238 | Lyon | Jan. 30, 1945 |